(12) United States Patent
Mabuchi

(10) Patent No.: US 7,375,753 B2
(45) Date of Patent: May 20, 2008

(54) SOLID-STATE IMAGER AND CAMERA SYSTEM

(75) Inventor: Keiji Mabuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 636 days.

(21) Appl. No.: 10/503,749

(22) PCT Filed: Feb. 12, 2003

(86) PCT No.: PCT/JP03/01426

§ 371 (c)(1),
(2), (4) Date: Aug. 5, 2004

(87) PCT Pub. No.: WO03/069897

PCT Pub. Date: Aug. 21, 2003

(65) Prior Publication Data

US 2005/0083408 A1    Apr. 21, 2005

(30) Foreign Application Priority Data

Feb. 12, 2002  (JP) .............................. 2002-033583

(51) Int. Cl.
*H04N 3/14* (2006.01)
*H04N 5/335* (2006.01)

(52) U.S. Cl. ........................ 348/308; 348/241; 348/243
(58) Field of Classification Search ................. 348/308
See application file for complete search history.

(56) References Cited

U.S. PATENT DOCUMENTS 6,787,751 B2 * 9/2004 Tanimoto ................. 250/208.1
6,965,408 B2 * 11/2005 Hiyama et al. ............. 348/308
2002/0032545 A1   3/2002 Mabuchi

FOREIGN PATENT DOCUMENTS

| EP | 0 908 957 | 4/1999 |
| JP | 11-112018 | 4/1999 |
| JP | 2002-051263 | 2/2002 |

OTHER PUBLICATIONS

Wen Fang, Arthur Brunnschweiler, and Peter Ashburn; "An Accurate Analytical BiCMOS Delay Expression and its Application to Optimizing High-Speed BiCMOS Circuits;" Feb. 1992; IEE Journal of Solid-State Circuits; vol. 27, No. 2; pp. 191-202.*

* cited by examiner

*Primary Examiner*—Ngoc-Yen Vu
*Assistant Examiner*—David Holt
(74) *Attorney, Agent, or Firm*—Robert J. Depke; Rockey, Depke & Lyons, LLC.

(57) ABSTRACT

When making a potential of a floating node 0V at the time of nonselection, electrons leak from the floating node to a photodiode and noise is generated. A MOS type solid-state imaging device comprised of unit pixels 10, each having a photodiode 11, a transfer transistor 12 for transferring a signal of this photodiode 11 to a floating node N11, an amplifier transistor 13 for outputting a signal of the floating node N11 to a vertical signal line 22, and a reset transistor 14 for resetting the floating node N11, arranged in a matrix, wherein, as a buffer final stage 29 for driving a drain line 23, a buffer final stage having an inverter configuration formed by arranging a P-type MOS transistor on a ground side is used, thereby making the potential of the floating node N11 for example 0.5V at the time of nonselection and preventing electrons from leaking to the photodiode 11 through the transfer transistor 12.

2 Claims, 8 Drawing Sheets

SOLID-STATE IMAGER AND CAMERA SYSTEM

This application claims priority to Japanese Patent Application No. JP2002-033583, filed Feb. 12, 2002 which is incorporated herein by reference.

TECHNICAL FIELD

The present invention relates to a solid-state imaging device and camera system, more particularly relates to an X-Y address type solid-state imaging device such as an MOS type solid-state imaging device and a camera system using this as the imaging device.

BACKGROUND ART

As an X-Y address type solid-state imaging device, for example, an MOS type solid-state imaging device, one configured by a large number of unit pixels, each unit pixel comprised of three transistors, arranged in a matrix has been known. The configuration of a unit pixel in this case is shown in FIG. 1. As clear from the figure, a unit pixel 100 has a photodiode (PD) 101, a transfer transistor 102, an amplifier transistor 103, and a reset transistor 104.

An MOS type solid-state imaging device employing the above pixel configuration operates to make the potential of a floating node N101 a low level (hereinafter described as an "L level") through the reset transistor 104 from a drain line 105 during the period where a row is not selected and make the potential of the floating node N101 a high level (hereinafter, described as an "H level") when the row is selected.

As explained above, a conventional MOS type solid-state imaging device configured by unit pixels, each comprising three transistors, arranged in a matrix makes the potential of the floating node N101 the L level (0V) during a nonselection period, therefore sometimes electrons leaked from the floating node N101 to the photodiode 101 and noise was generated due to this leakage.

DISCLOSURE OF THE INVENTION

An object of the present invention is to provide a solid-state imaging device able to prevent leakage of electrons from a floating node to a photodiode and able to reduce the noise due to that leakage and a camera system using this as an imaging device.

To attain the above object, a solid-state imaging device according to a first aspect of the present invention is provided with a photoelectric conversion element; a transfer transistor of a first conductivity type for transferring a signal of the photoelectric conversion element to a floating node; an amplifier transistor for outputting a signal of the floating node to a signal line; a reset transistor of the first conductivity type for resetting said floating node; and a driving means for driving an interconnect to which a main electrode of the reset transistor on an opposite side to the floating node is connected, wherein the driving means has a first transistor of a second conductivity type connected between the interconnect and a voltage source and a second transistor of the second conductivity type connected between the interconnect and a ground and driven by a signal having an inverse polarity to that for the first transistor.

A camera system according to a second aspect of the present invention has a solid-state imaging device, an optical system for guiding incident light to an imaging portion of the solid-state imaging device, and a signal processing circuit for processing an output signal of the solid-state imaging device, wherein the solid-state imaging device has a photoelectric conversion element, a transfer transistor of a first conductivity type for transferring a signal of the photoelectric conversion element to a floating node, an amplifier transistor for outputting a signal of the floating node to a signal line, a reset transistor of the first conductivity type for resetting the floating node, a first transistor of a second conductivity type connected between the interconnect to which the main electrode of the reset transistor on the opposite side to the floating node is connected and the voltage source, and a second transistor of the second conductivity type connected between the interconnect and the ground and driven by a signal having an inverse polarity to that for the first transistor.

A solid-state imaging element according to a third aspect of the present invention has a photoelectric conversion element, a first transistor of a first conductivity type connected to the photoelectric conversion element, a second transistor of the first conductivity type having one end connected to a first electrode of the first transistor, a third transistor in which a control electrode is connected to the first electrode and one electrode is electrically connected to a vertical signal line, a sample and hold circuit connected to the vertical selection line, and a vertical drive circuit connected to the other end of the second transistor, wherein the vertical drive circuit is provided with a fourth transistor of the second conductivity type connected to a first reference potential and a fifth transistor of the second conductivity type connected to the fourth transistor and a second reference potential and wherein a connecting point of the fourth transistor and the fifth transistor is connected to the other end.

According to the present invention, when a reset voltage is supplied from a scanning system at the time of for example selection, this reset voltage is supplied to the interconnect of the reset transistor by the driving means. This reset voltage is given to the floating node through the reset transistor, whereby the potential of the node is reset. On the other hand, at the time of nonselection when a reset voltage is not supplied from the scanning system, a channel voltage of the second transistor of the second conductivity type on the ground side of the driving means is supplied to the interconnect of the reset transistor. Then, when the reset transistor becomes conductive, the potential of the floating node is determined by the channel voltage of the second transistor and no longer 0V. Due to this, leakage of electric charges from the floating node to the photoelectric conversion element through the transfer transistor is prevented.

BRIEF DESCRIPTION OF THE INVENTION

BEST MODE FOR WORKING THE INVENTION

Below, a detailed explanation will be given of embodiments of the present invention with reference to the attached drawings.

First Embodiment

Figure 1:
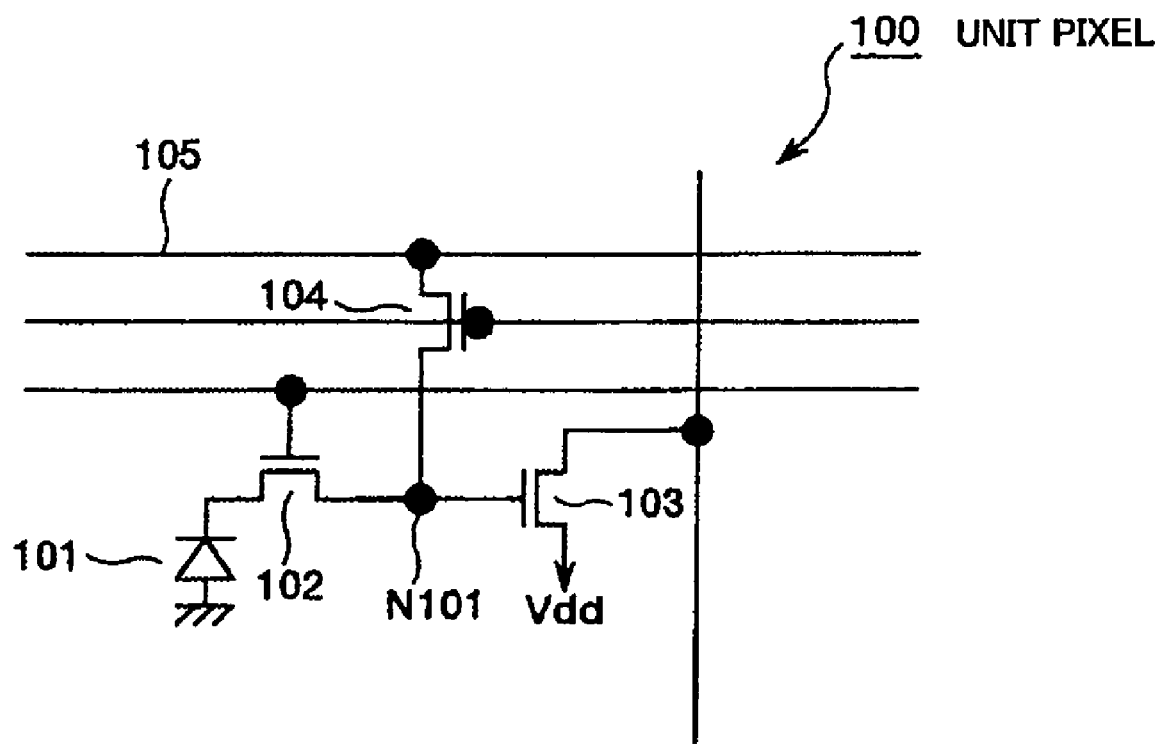
FIG. 1 is a view of the configuration of a unit pixel for explaining the problem of the prior art.
Figure 2:
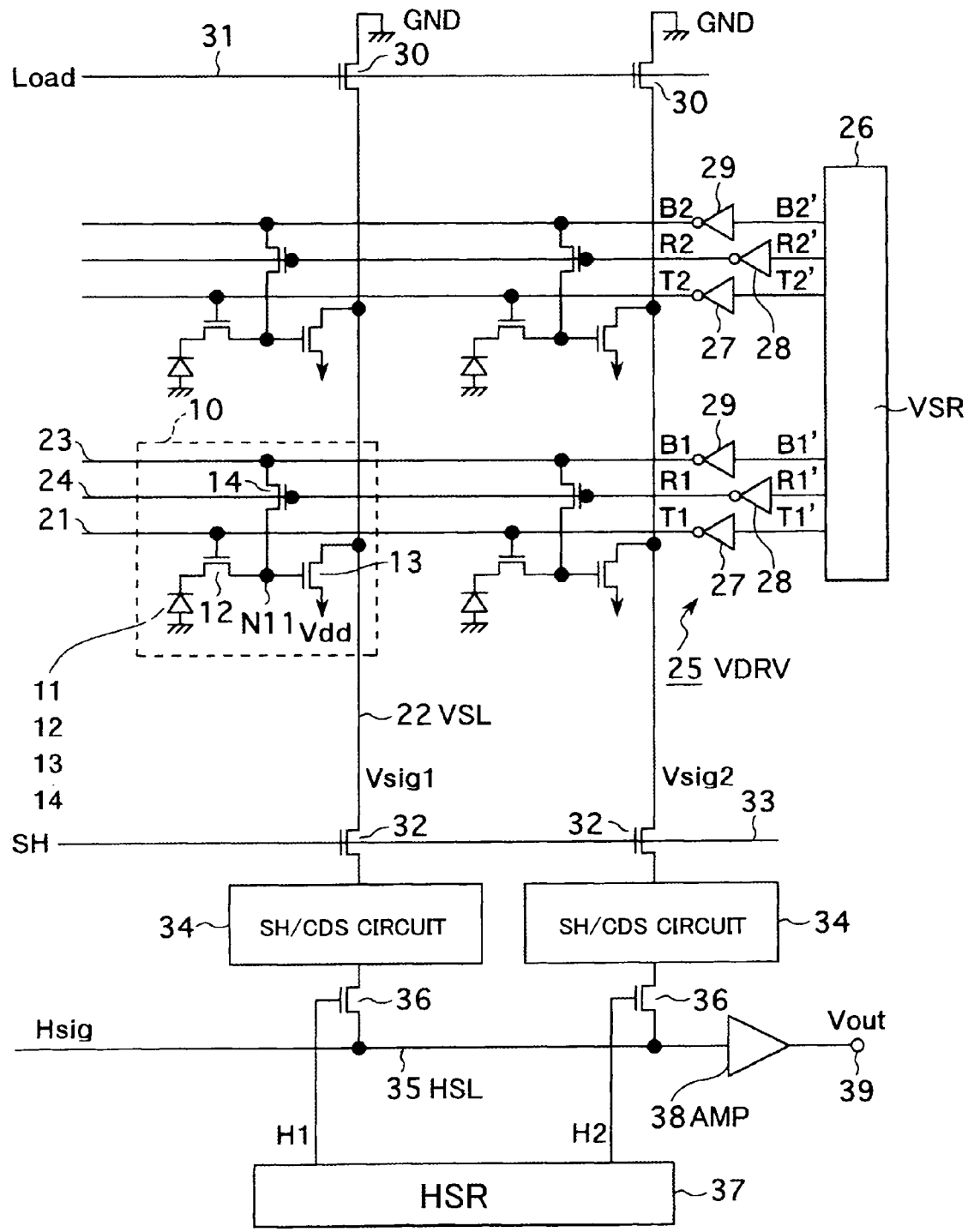
FIG. 2 is a circuit diagram of an example of the configuration of for example a MOS type solid-state imaging device according to a first embodiment of the present invention.

FIG. 2 is a circuit diagram of an example of the configuration of a solid-state imaging device according to a first embodiment of the present invention, for example, a MOS type solid-state imaging device. Note that, in a MOS type solid-state imaging device, a large number of unit pixels are arranged in for example a matrix, but here, for simplification of the drawing, a pixel array of 2 rows×2 columns is drawn.

In FIG. 2, a unit pixel 10 has, in addition to a photoelectric conversion element constituted by for example a photodiode (PD) 11, a three-transistor configuration having three N type (first conductivity type) MOS transistors of a transfer transistor 12, an amplifier transistor 13, and a reset transistor 14.

In this pixel configuration, the photodiode 11 photoelectrically converts and stores the incident light to a signal charge (for example electrons) having a charge in accordance with the amount of light thereof. The transfer transistor 12 is connected between a cathode of the photodiode 11 and a floating node N11, has a gate connected to a vertical selection line 21, and has the function of transferring a signal charge stored in the photodiode 11 to the floating node N11 by becoming conductive (on) by the signal from this vertical selection line 21.

The amplifier transistor 13 is connected between the vertical signal line (VSL) 22 and a power supply Vdd, has a gate connected to the floating node N11, and has the function of outputting the potential of the floating node N11 to the vertical signal line 22. The reset transistor 14 has a drain (one main electrode) connected to a drain line (interconnect) 23, a source (the other main electrode) connected to the floating node N11, and a gate connected to a reset line 24 and has a function of resetting the potential of the floating node N11.

In a pixel region (imaging region) formed by these unit pixels 10 arranged in a matrix, three lines of the vertical selection line 21, drain line 23, and reset line 24 are laid in a horizontal (H) direction (left-right direction of the figure) for every row of the pixel array, and the vertical signal line 22 is laid in a vertical (V) direction (up-down direction of the figure) for every column. Then, the vertical selection line 21, the drain line 23, and the reset line 24 are driven by a vertical drive circuit (VDRV) 25.

The vertical drive circuit (VDRV) 25 has a V shift register (VSR) 26 for sequentially outputting vertical selection pulses T' (T1', T2', . . . ), reset pulses R' (R1', R2', . . . ), and reset voltages B' (B1', B2', . . . ), in units of rows and buffer final stages (driving means) 27, 28, and 29 for driving the vertical selection line 21, the reset line 24, and the drain line 23 by a vertical selection pulse T, a reset pulse R, and a reset voltage B obtained by inverting polarities of the vertical selection pulse T', the reset pulse R', and the reset voltage B'.

Note that although the illustration is omitted, the V shift register 26 includes a multiplexer for entering the drive pulses (above vertical selection pulse T', the reset pulse R', and the reset voltage B') into the selected row and a buffer for buffering the drive pulse in each stage. The final stages of the buffer are the above buffer final stages 27, 28, and 29.

Figure 3:
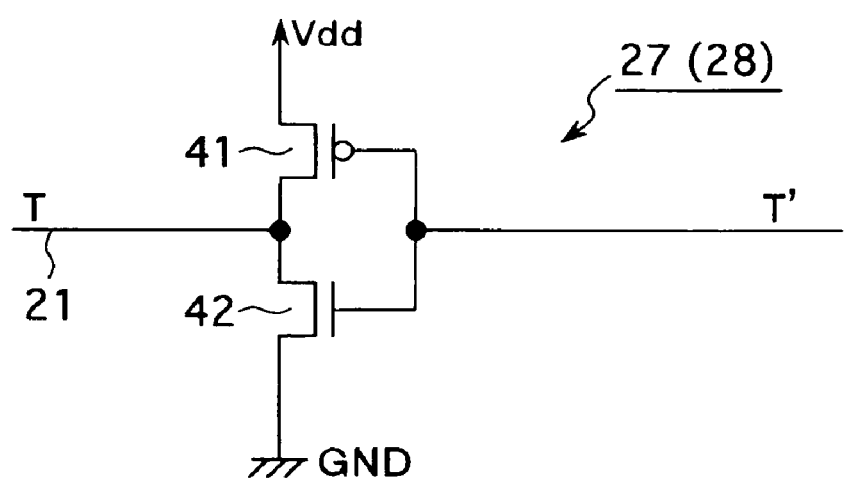
FIG. 3 is a circuit diagram of a general example of the configuration of a buffer final stage.

Among the buffer final stages 27, 28, and 29, both of the buffer final stages 27 and 28 for driving the vertical selection line 21 and the reset line 24 exhibit a usual CMOS inverter configuration. Namely, when taking the buffer final stage 27 as an example, as shown in FIG. 3, it comprises a P-type MOS transistor 41 connected between the vertical selection line 21 and the power supply (voltage source) Vdd and an N-type MOS transistor 42 connected between the vertical selection line 21 and the ground (GND) and having a gate commonly connected with the P-type MOS transistor 41, each gate being given the vertical selection pulse T' from the V shift register 26.

Figure 4:
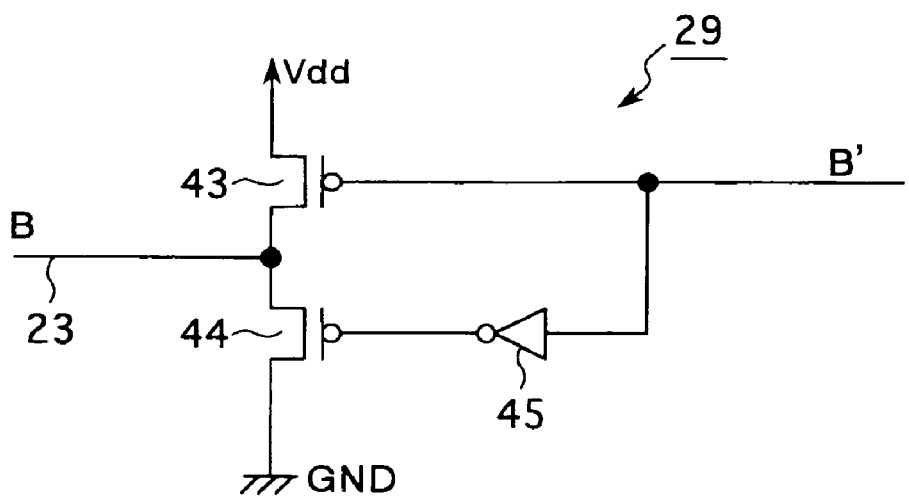
FIG. 4 is a circuit diagram of an example of the configuration of the buffer final stage according to the first embodiment.

On the other hand, the configuration of the buffer final stage 29 for driving the drain line (interconnect) 23 is the portion characterizing the present invention. This buffer final stage 29 has, as shown in FIG. 4, a first P-type (second conductivity type) MOS transistor 43 connected between the drain line 23 and the power supply Vdd and having a gate given the reset voltage B' from the V shift register 26, a second P-type MOS transistor 44 connected between the drain line 23 and the ground, and an inverter 45 for inverting the polarity of the reset voltage B' and giving it to the gate of the second P-type MOS transistor 44.

Referring to FIG. 2 again, at one side of the vertical direction (up-down direction) of the pixel region, for every column, a load transistor 30 comprising an N-type MOS transistor is connected between one end of the vertical signal line 22 and the ground. This load transistor 30 has a gate connected to a load line 31 and acts as a constant current source for supplying a constant current to the vertical signal line 22.

On the other side of the vertical direction of the pixel region, the other end of the vertical signal line 22 has one end (one main electrode) of a sample and hold (SH) switch 32 formed by the N-type MOS transistor connected to it. The control end (gate) of this sample and hold switch 32 is connected to an SH line 33.

The other end (other main electrode) of the sample and hold switch 32 has an input end of a sample and hold (SH)/CDS (correlated double sampling) circuit 34 connected to it. The sample and hold/CDS circuit 34 is a circuit for sampling and holding a potential Vsig of the vertical signal line 22 and performing correlated double sampling (CDS). Here, the "correlated double sampling" means the processing of sampling two voltage signals input in a time series and outputting the difference.

A horizontal selection switch 36 formed by the N-type MOS transistor is connected between the output end of the sample and hold/CDS circuit 34 and a horizontal signal line (HSL) 35. The control end (gate) of this horizontal selection switch 36 is given horizontal scanning pulses H (H1, H2, . . . ) sequentially output from an H shift register (HSR) 37 configuring the horizontal drive circuit at the time of the horizontal scanning.

When the horizontal scanning pulses H are given and the horizontal selection switch 36 turns on, the signal which is sampled by correlation double sampling at the sample and hold/CDS circuit 34 is read out through the horizontal selection switch 36 to the horizontal signal line 35. This read out signal Hsig is derived as an output signal Vout through an output amplifier (AMP) 38 connected to one end of the horizontal signal-line 35 from an output terminal 39.

Next, an explanation will be given of the operation of a MOS type solid-state imaging device according to the first embodiment having the above configuration by using the timing charts of FIG. 5A to FIG. 5G. Here, an explanation will be given paying attention to the pixel of the bottom left of FIG. 2.

First, at the time of nonselection, the potential of the floating node N11 has become 0.5V for the reason explained later. At this time, the reset voltage B1' output from the V shift register 26 has become 0V. Due to this, as apparent from the circuit operation of FIG. 4 showing a concrete example of the buffer final stage 29, the potential of the drain line 23 (reset voltage) B1 has become the power supply voltage Vdd, for example 3.0V.

Figure 5:
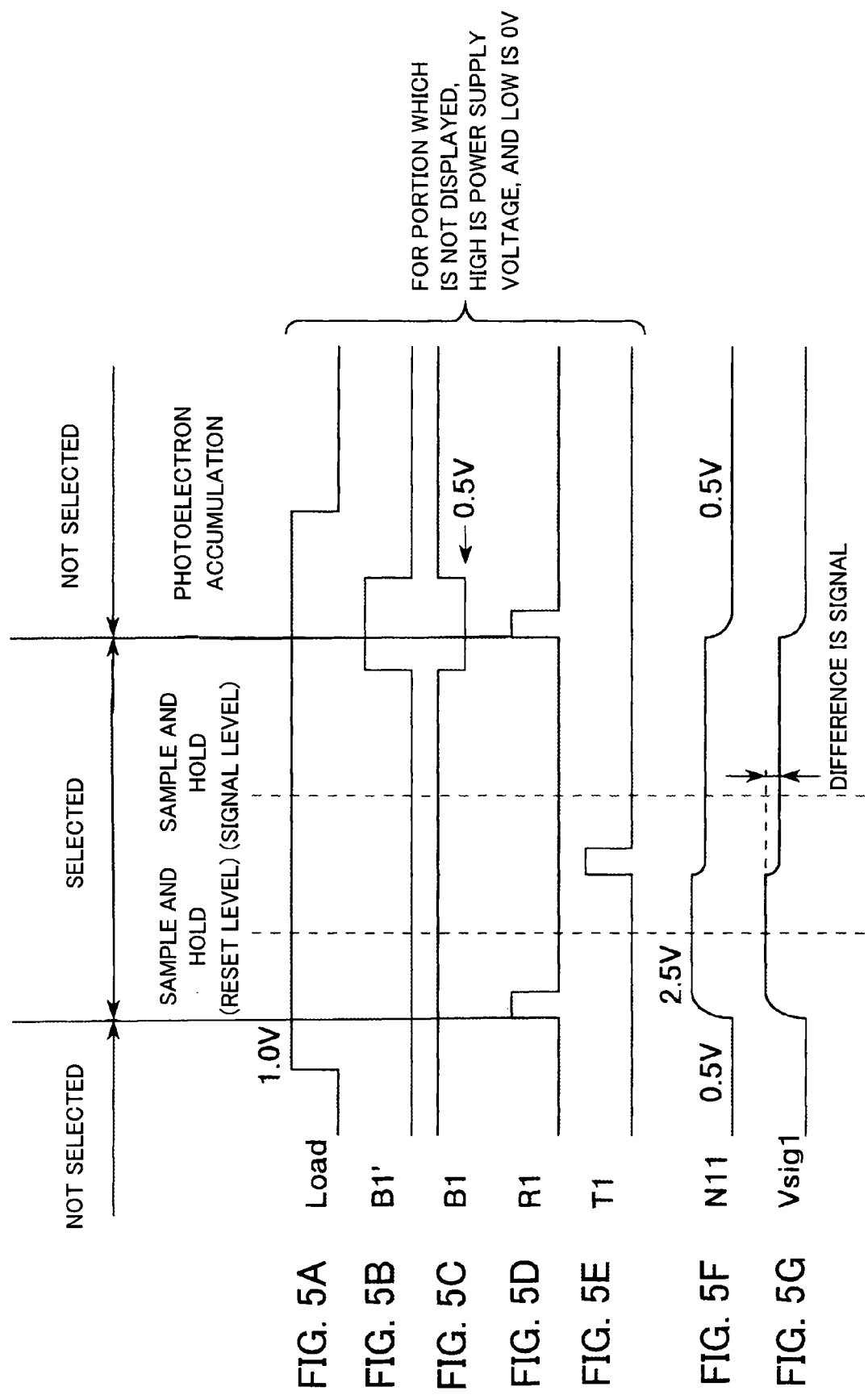
FIGS. 5A to 5G are timing charts for explaining the operation of a MOS type solid-state imaging device according to the first embodiment.

Here, as shown in FIG. 5A, the signal level of the load signal given to the load line 28 is set at for example 1.0V, and next, the reset pulse R1' of the L level is output from the V shift register 26. This reset pulse R1' is converted in polarity at the buffer final stage 28 and becomes the reset pulse R1 of the H level as shown in FIG. 5D and applied to the gate of the reset transistor 14. Then, the reset transistor 14 becomes conductive. Therefore, the floating node N11 is linked with the drain line 23 through the reset transistor 14, and as shown in FIG. 5F, the potential thereof is reset to the H level determined by the channel voltage of the reset transistor 14, for example 2.5V. Due to this, the gate potential of the amplifier transistor 13 also becomes 2.5V.

The potential Vsig1 of the vertical signal line 22 is determined by the amplifier transistor having the highest gate voltage among the amplifier transistors of many pixels linked with the vertical signal line 22. As a result, the potential Vsig1 of the vertical signal line 22 is determined by the potential of the floating node N11. That is, this pixel 10 becomes the selected state.

Specifically, the amplifier transistor 13 forms a source follower circuit together with the load transistor 30, and the output voltage thereof appears as the pixel potential Vsig1 on the vertical signal line 22 as shown in FIG. 5G. The potential Vsig1 at this time becomes the voltage of the reset level. The voltage of this reset level is input through the sample and hold switch 32 to the sample and hold/CDS circuit 34.

Next, the vertical selection pulse T1' output from the V shift register 26 becomes the L level, and the vertical selection pulse T1 output from the buffer final stage 27 becomes the H level based on this. Then, the transfer transistor 12 becomes conductive, light is photoelectrically converted at the photodiode 11, and the stored signal charge (electrons in the present example) is transferred (read out) to the floating node N11. Due to this, the gate potential of the amplifier transistor 13 changes in a negative direction in accordance with the amount of the signal charge read out from the photodiode 11 to the floating node N11. The potential Vsig1 of the vertical signal line 22 changes in accordance with that.

The potential Vsig1 at this time becomes the voltage of the original signal level. The voltage of this signal level is input through the sample and hold switch 32 to the sample and hold/CDS circuit 34. Then, as shown in FIG. 5G, the sample and hold/CDS circuit 34 performs processing for taking the difference between the voltage of the previous reset level and the voltage of the signal level this time and holding this difference voltage.

Next, as shown in FIG. 5B, the reset voltage B1' output from the V shift register 26 becomes the H level, and the reset voltage B1 output from the buffer final stage 29 becomes the L level as shown in FIG. 5C based on this. At this time, as apparent from the circuit operation of FIG. 4 showing a concrete example of the buffer final stage 29, the reset voltage B1 given to the pixel 10 through the drain line 23 is not 0V, but is determined by the channel voltage of the P-type MOS transistor 44 (the value determined from the threshold value) and becomes for example 0.5V in the case of the present embodiment.

In this state, when the reset signal R1' of the L level is output from the V shift register 26 and the reset signal R1 of the H level is output from the buffer final stage 28 based on this, the reset transistor 14 becomes conductive, therefore the floating node N11 is linked to the drain line 23 through the reset transistor 14, the potential thereof becomes the potential of the drain line 23, that is 0.5V, and the pixel 10 returns to the nonconductive state.

In this nonselection state, as shown in FIG. 5F, the potential of the floating node N11 is not 0V, but 0.5V, therefore the electrons are prevented from leaking to the photodiode 11 through the transfer transistor 12. Here, the potential of the floating node N11 becomes 0.5V due to the buffer final stage having the circuit configuration shown in FIG. 4 being used as the buffer final stage 29 for driving the drain line 23 and the P-type MOS transistor 44 being arranged on the ground side.

Incidentally, as a countermeasure for obtaining the same effect, a configuration using a usual CMOS inverter as the buffer final stage 29 and arranging a P-type MOS transistor between the output end thereof and the drain line 23 can also be considered. When this configuration is employed, however, the P-type MOS transistor may become a resistor and prolong the time constant. On the other hand, by using the buffer final stage 29 of FIG. 4 employing a configuration arranging the P-type MOS transistor in place of the N-type MOS transistor on the ground side when using the usual CMOS inverter, the drain line 23 can be directly driven by the buffer final stage 29 and the above problem of the time constant will not occur, therefore the driving capability can be raised and the speed can be raised.

The pixels of the first row are all simultaneously driven by the above one series of operations, and one row's worth of the signals are simultaneously held (stored) in the sample and hold/CDS circuit 34. Thereafter, a period of photoelectric conversion (exposure) and storage of the photo-electrons at the photodiode 11 is entered. Then, although not described in the timing charts of FIGS. 5A to 5G, an H shift register 37 starts the horizontal scanning operation during this photo-electron storage period and sequentially outputs horizontal scanning pulses H1, H2, . . . Due to this, the horizontal selection switches 36 sequentially become conductive and sequentially lead signals held in the sample and hold/CDS circuit 34 to the horizontal signal line 35.

When performing the same operation for the pixels of the second row next, the pixel signals of the pixels of the second row are read out. Below, by sequentially vertically scanning them by the V shift register 26, the pixel signals of all rows can be read out. Further, by sequentially horizontally scanning them for every row by the H shift register 37, the signals of all pixels can be read out.

As explained above, by providing a MOS type solid-state imaging device comprised of unit pixels 10, each having a three-transistor configuration having the transfer transistor 12, the amplifier transistor 13, and the reset transistor 14, arranged in a matrix wherein, as the buffer final stage 29 for driving the drain line 23, use is made of a buffer final stage having an inverter configuration formed by arranging a P-type MOS transistor 44 on the ground side, the potential of the floating node N11 at the time of nonselection becomes for example 0.5V by the function of the P-type MOS transistor 44, therefore the leakage of the electrons to the photodiode 11 through the transfer transistor 12 can be reliably prevented.

As a result, the noise due to the leakage of electrons from the floating node N11 to the photodiode 11 can be suppressed. Further, in the generation of an intermediate voltage (0.5V in the present example), it is not necessary to supply a current as in resistance division, therefore the power consumption will not increase and, in addition, the circuit scale is small, so there is the advantage that mounting is easy.

Note that, as the channel voltage of the P-type MOS transistor 44 configuring the buffer final stage 29, experimental results by the present inventors show that a voltage of 0.4V to 0.7V is desired in order to prevent leakage to the photodiode 11 and prevent lowering of a voltage margin.

Second Embodiment

Figure 6:
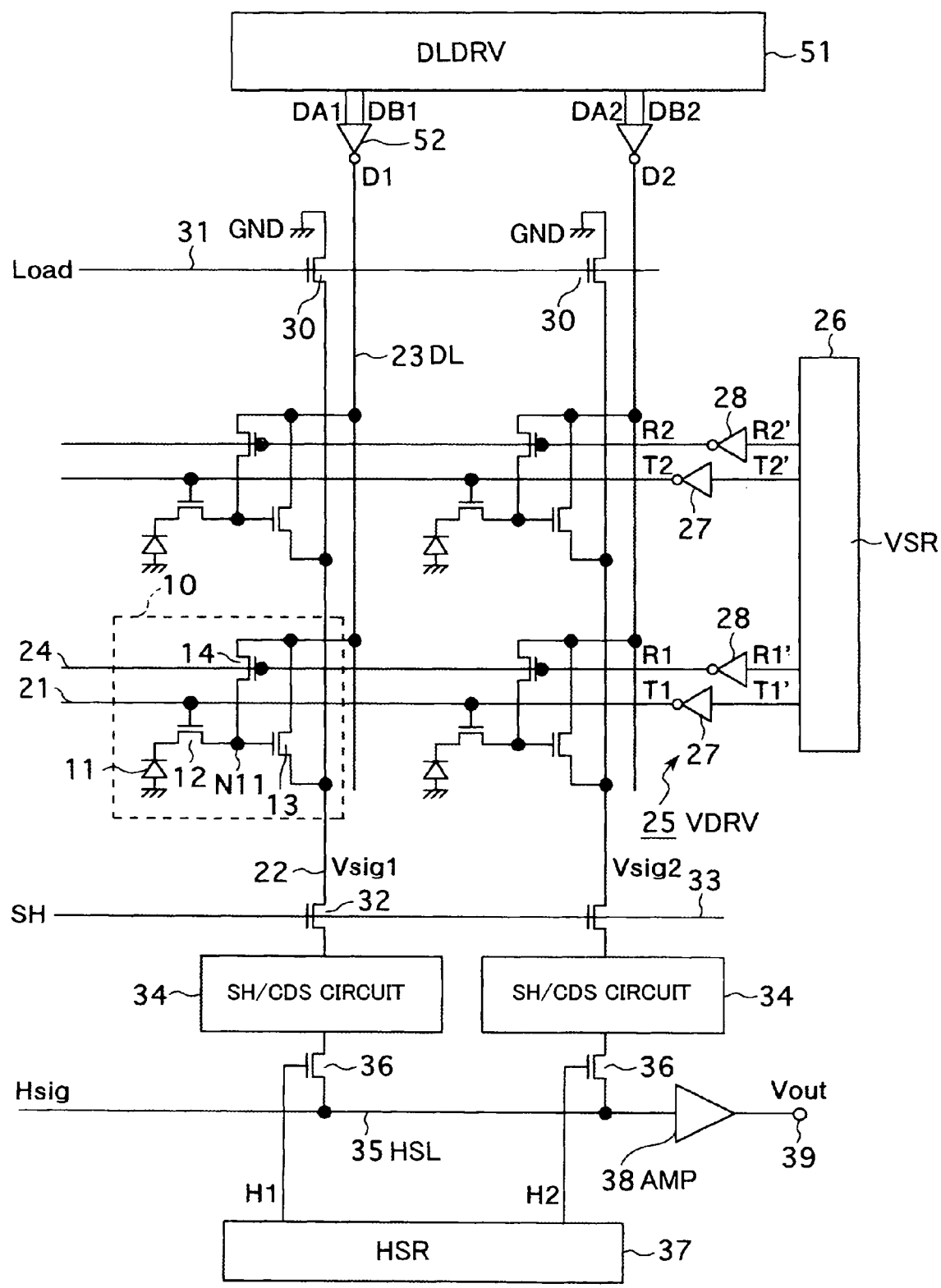
FIG. 6 is a circuit diagram of an example of the configuration of for example a MOS type solid-state imaging device according to a second embodiment of the present invention.

FIG. 6 is a circuit diagram of an example of the configuration of a solid-state imaging device according to a second embodiment of the present invention, for example, a MOS type solid-state imaging device. In the figure, the same notations are assigned to portions equivalent to those of FIG. 2.

The MOS type solid-state imaging device according to the first embodiment explained before is configured arranging a drain line 23 linked to the drain of the reset transistor 14 of a unit pixel 10 for every row in the horizontal direction and making the drain of the amplifier transistor 13 electrically independent from the drain of the reset transistor 14. As opposed to this, the MOS type solid-state imaging device according to the present embodiment is configured electrically connecting the drain of the amplifier transistor 13 to the drain of the reset transistor 14.

Specifically, as apparent from FIG. 6, a drain line (DL) 23 is laid in the vertical direction for every column, and the drains of the amplifier transistor 13 and the reset transistor 14 of the pixel 10 are commonly connected to this drain line 13 for every column. The source of the amplifier transistor 13 is connected to the vertical signal line 22. The drain lines 23 are simultaneously driven in all columns by a drain line drive circuit (DLDRV) 51 via a buffer final stage 52. As a result, the drains of the amplifier transistor 13 and the reset transistor 14 are simultaneously driven for all pixels.

Figure 7:
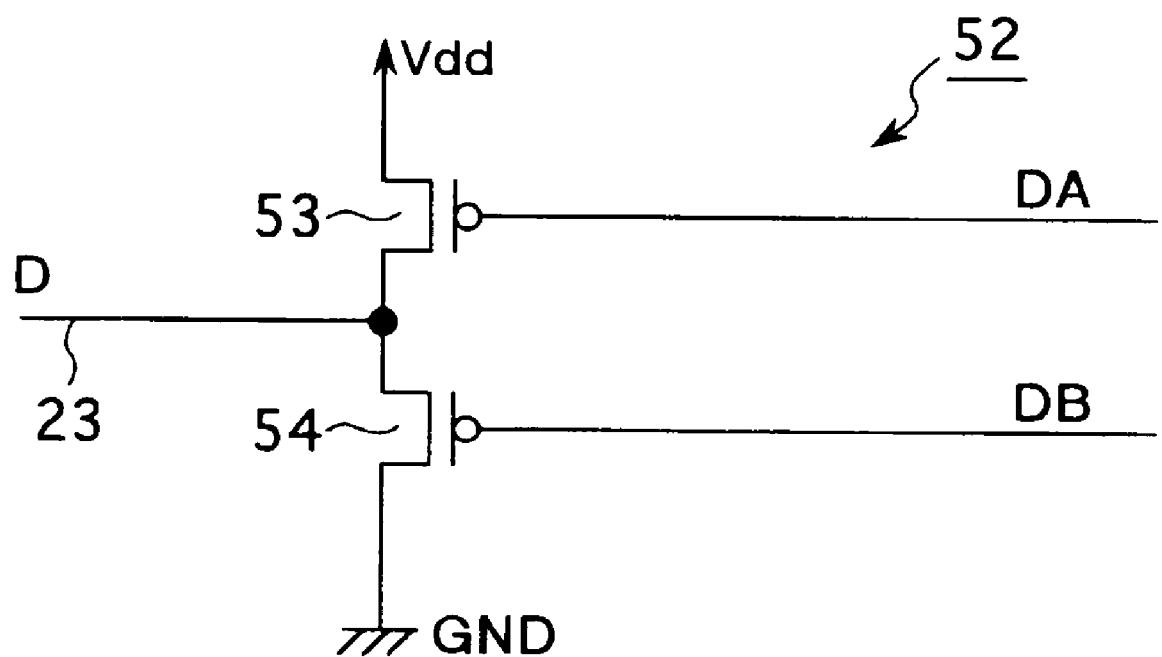
FIG. 7 is a circuit diagram of an example of the configuration of the buffer final stage according to a second embodiment.

FIG. 7 shows a concrete example of the configuration of the buffer final stage 52. As apparent from FIG. 7, the buffer final stage 52 is configured comprising a first P-type MOS transistor 53 connected between the drain line 23 and the power supply Vdd and having a gate given a first reset voltage DA and a second P-type MOS transistor 54 connected between the drain line 23 and the ground and having a gate given a second reset voltage DB.

Figure 8:
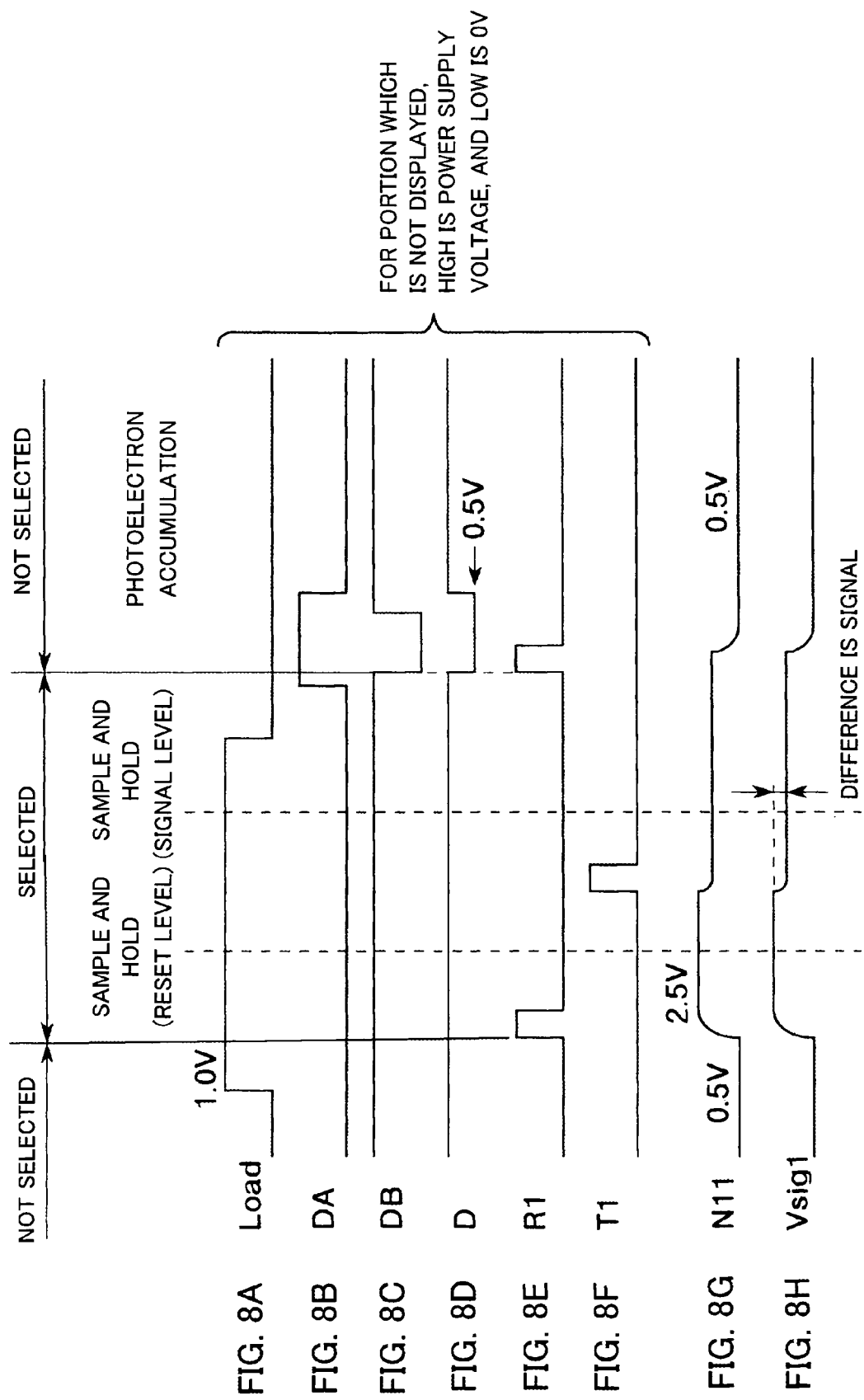
FIGS. 8A to 8H are timing charts for explaining the operation of a MOS type solid-state imaging device according to the second embodiment.

This buffer final stage 52 is supplied from the drain line drive circuit 51 with first and second reset voltages DA (DA1, DA2, ... ), DB (DB1, DB2, ... ) having polarities and timing relationships as shown in the timing charts of FIG. 8. Due to this, the first and second P-type MOS transistors 53 and 54 of the buffer final stage 52 turn on/off at timings different from each other based on the first and second reset voltages DA and DB. In this way, the first and second P-type MOS transistors 53 and 54 are made to turn on/off at different timings for the following reason.

When the first and second P-type MOS transistors 43 and 44 are operated by signals having inverse polarities as in the buffer final stage 29 used in the first embodiment, an open/close operation of the P-type MOS transistor 44 on the ground side is delayed by exactly the delay time of the inverter, therefore, particularly when the reset voltage B changes from the H level to the L level, both the MOS transistors 43 and 44 simultaneously become the ON state for a short time, so a large current flows and an increase of the power consumption and generation of noise of the drain line 23 occur.

As opposed to this, by operating both MOS transistors 53 and 54 at on/off timings different from each other, for example, giving different reset voltages DA and DB to the first and second P-type MOS transistors 53 and 54, turning off one (MOS transistor 53) first, then turning on the other (MOS transistor 54) as in the buffer final stage 52 used in the present embodiment, both MOS transistors 53 and 54 will not simultaneously become the ON state, therefore the problems of the increase of the power consumption and the generation of noise of the drain line 23 will not occur.

Particularly, since the MOS type solid-state imaging device according to the present embodiment is configured to simultaneously drive drains of the amplifier transistors 13 and the reset transistors 14 in all pixels, the current becomes larger than that of the case of the MOS type solid-state imaging device according to the first embodiment driving them only in units of rows, therefore the effect of turning on/off the P-type MOS transistors 53 and 54 at different timings is large.

Further, the MOS type solid-state imaging device according to the first embodiment is configured so that after turning off the first and second P-type MOS transistors 43 and 44, the load signal Load is turned off (L level), but in contrast, the MOS type solid-state imaging device according to the present embodiment, as shown in the timing charts of FIGS. 8A to 8H, is configured to turn off the load signal Load prior to the on/off operation of the first and second P-type MOS transistors 53 and 54. This is because the MOS type solid-state imaging device according to the present embodiment is configured to electrically connect the drain of the amplifier transistor 13 to the drain of the reset transistor 14 to drive them together, therefore, the supply of the current to the vertical signal line 22 is cut off earlier than the on/off operation of the P-type MOS transistors 53 and 54.

In the MOS type solid-state imaging device according to the second embodiment having the above configuration, as clear from the above explanation, the drain lines 23 are simultaneously driven in all columns by the output voltages D (D1, D2, ... ) of the buffer final stage 52 based on the first and second reset voltages DA and DB output from the drain line drive circuit 51, while the vertical selection lines 21 and the reset lines 24 will be sequentially driven for one row each by the vertical scanning by the V shift register 26 in the same way as the MOS type solid-state imaging device according to the first embodiment. Note the rest of the fundamental technical concept and operation are the same as those of the case of the MOS type solid-state imaging device according to the first embodiment.

In the case of this MOS type solid-state imaging device according to the second embodiment, the mode of operation and effects the same as those of the MOS type solid-state imaging device according to the first embodiment can be obtained. Namely, by using the buffer final stage having the inverter configuration formed by arranging the P-type MOS transistor 54 on the ground side as the buffer final stage 52 for driving the drain line 23, the potential of the floating node N11 at the time of nonselection becomes for example 0.5V by the function of the P-type MOS transistor 54, and the leakage of electrons through the transfer transistor 12 to the photodiode 11 can be reliably prevented, so the noise due to the leakage can be suppressed. Further, the drain 23 is directly driven by the buffer final stage 52, so the driving capability can be raised and an increase of speed can be achieved.

In addition to the above mode of operations and effects, the MOS type solid-state imaging device according to the second embodiment is configured electrically connecting the drain of the amplifier transistor 13 to the drain of the reset transistor 14, therefore the drain regions of both transistor 13 and 14 can be shared, so there is the advantage that the unit pixel 10 can be configured smaller by that amount.

Note that, in the present embodiment, a so-called vertical interconnect for laying a drain line 23 in the vertical direction for every column was employed, but the drain lines 23 are simultaneously driven in all columns, so it is also possible to perform lay lines over the entire surface like a light blocking film.

Further, in the above embodiments, when the drain of the reset transistor 14 was made the L level, the reset pulse R was given to the gate thereof, but for example when the threshold voltage Vth of the reset transistor 14 is sufficiently low, for example, −0.5V or less, it is not necessary to give the reset pulse R to the gate of the reset transistor 14 when making the drain of the reset transistor 14 the L level.

Further, in the above embodiments, the explanation was given taking as an example the case of using N-type MOS transistors as the three transistors of the unit pixel 10, but it is also possible to form these transistors as P-type MOS transistors, use an N-type MOS transistor as the transistor configuring the buffer final stage, and switch the high level and the low level of the voltage. Further, it is also possible to configure the other transistor by an inverse conductivity type transistor. Further, the photoelectric conversion element is not limited to a photodiode and may be another photoelectric conversion element such as a photo-gate as well.

Figure 9:
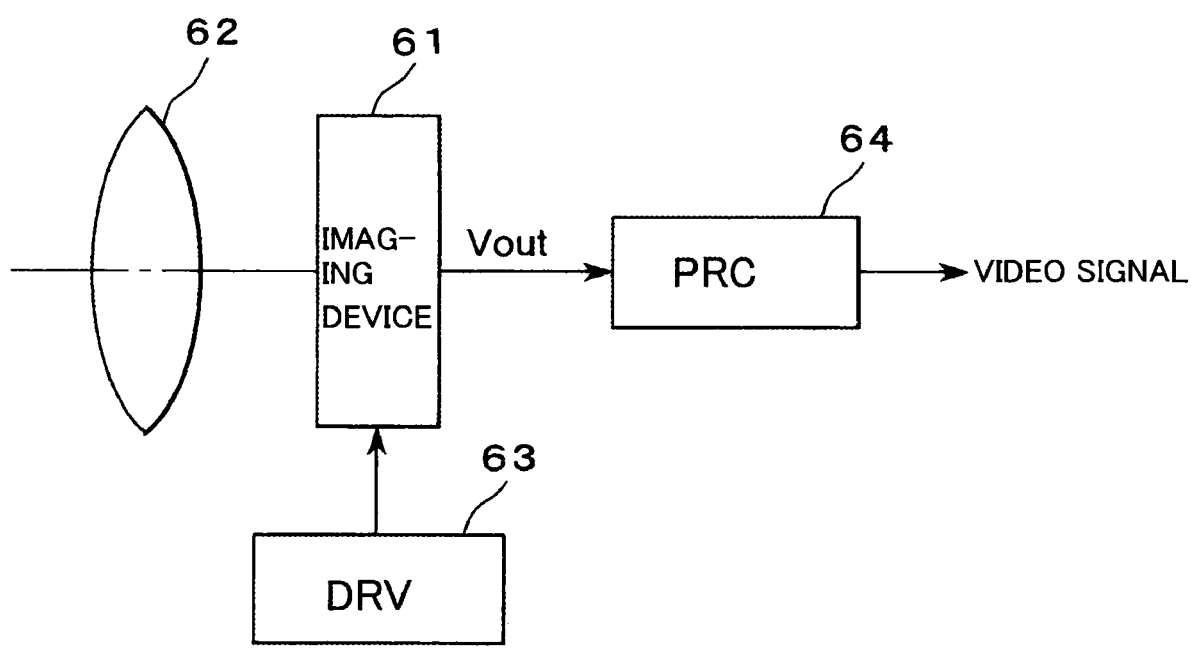
FIG. 9 is a block diagram of an example of the configuration of a camera system according to the present invention.

FIG. 9 is a block diagram of the schematic configuration of a camera system according to the present invention. The present camera system has an imaging device 61, an optical system for guiding incident light to the pixel region of this imaging device 61, for example, a lens 62 for focusing the incident light (image light) onto the imaging surface, a drive circuit 63 for driving the imaging device 61, a signal processing circuit 64 for processing the output signal of the imaging device 61, and so on.

In a camera system having the above configuration, as the imaging device 61, use is made of a solid-state imaging device according to the first or second embodiment explained before, that is, a MOS type solid-state imaging device wherein the unit pixel has a three-transistor configuration comprising a transfer transistor, an amplifier transistor, and a reset transistor in addition to a photoelectric conversion element, and, as the driving means for driving the drain lines, use is made of one having the inverter configuration formed by arranging the P-type MOS transistor on the ground side.

The drive circuit (DRV) 63 has a timing generator (not illustrated) for generating various types of timing signals including a start pulse and a clock pulse for driving the V shift register 26 and the H shift register 37 in FIG. 2 and FIG. 6 and drives the imaging device (MOS type solid-state imaging device) 61 in order to realize the drive explained in the above example of operation. The signal processing circuit (PRC) 64 applies various signal processings to the output signal Vout of the MOS type solid-state imaging device 61 and outputs the same as the video signal.

In this way, according to the present camera system, by using the MOS type solid-state imaging devices according to the first and second embodiments explained before as the imaging device 61, these MOS type solid-state imaging devices can realize a reduction of the noise due to the leakage of electrons from the floating node to the photodiode with a small circuit scale and without increasing the power consumption, therefore a high image quality video image with little noise can be obtained with a small circuit scale and low power consumption.

INDUSTRIAL CAPABILITY

As described above, according to the solid-state imaging device and the camera system according to the present invention, the leakage of electric charges from the floating node to the photoelectric conversion element can be prevented by the function of the P-type MOS transistor, therefore the noise due to the leakage can be reduced, so the invention can be applied to a video camera etc.

The invention claimed is:

1. A solid-state imaging device, comprising:
   a photoelectric conversion element;
   a transfer transistor of a first conductivity type for transferring a signal of said photoelectric conversion element to a floating node;
   an amplifier transistor for outputting a signal of said floating node to a signal line;
   a reset transistor of the first conductivity type for resetting said floating node; and
   a driving means for driving an interconnect to which a main electrode of said reset transistor on an opposite side to said floating node is connected, wherein
   said driving means has:
   a first transistor of a second conductivity type connected between said interconnect and a voltage source and
   a second transistor of the second conductivity type connected between said interconnect and a around and driven by a signal having an inverse polarity to that for said first transistor,
   wherein said first conductivity type is an N type and said second conductivity type is a P type.

2. A camera system, comprising:
   a solid-state imaging device,
   an optical system for guiding incident light to an imaging portion of said solid-state imaging device, and
   a signal processing circuit for processing an output signal of said solid-state imaging device, wherein
   said solid-state imaging device has:
   a photoelectric conversion element,
   a transfer transistor of a first conductivity type for transferring a signal of said photoelectric conversion element to a floating node,
   an amplifier transistor for outputting a signal of said floating node to a signal line,
   a reset transistor of the first conductivity type for resetting said floating node,
   a first transistor of a second conductivity type connected between the interconnect to which the main electrode of said reset transistor on the opposite side to said floating node is connected and the voltage source, and a second transistor of the second conductivity type connected between said interconnect and the ground and driven by a signal having an inverse polarity to that for said first transistor, wherein said first conductivity type is an N type and said second conductivity type is a P type.

* * * * *